(12) United States Patent
Ke et al.

(10) Patent No.: US 9,710,491 B2
(45) Date of Patent: Jul. 18, 2017

(54) CONTENT-BASED IMAGE SEARCH

(75) Inventors: Qifa Ke, Cupertino, CA (US); Ming Liu, Bellevue, WA (US); Yi Li, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 566 days.

(21) Appl. No.: 12/610,810

(22) Filed: Nov. 2, 2009

(65) Prior Publication Data
US 2011/0106782 A1    May 5, 2011

(51) Int. Cl.
*G06F 17/30* (2006.01)

(52) U.S. Cl.
CPC .............................. *G06F 17/30256* (2013.01)

(58) Field of Classification Search
CPC ......... G06F 17/30247; G06F 17/30256; G06F 17/3028; G06F 17/30109
USPC ................................... 707/742, 706, 999.003
See application file for complete search history.

(56) References Cited

U.S. PATENT DOCUMENTS

| | | | |
|---|---|---|---|
| 5,579,471 A | 11/1996 | Barber | |
| 6,173,275 B1 | 1/2001 | Caid et al. | |
| 6,445,834 B1 | 9/2002 | Rising, III | |
| 6,564,263 B1 | 5/2003 | Bergman | |
| 6,594,386 B1 * | 7/2003 | Golshani et al. | 382/166 |
| 7,035,467 B2 | 4/2006 | Nicponski | |
| 7,103,215 B2 | 9/2006 | Buzuloiu | |
| 7,403,642 B2 | 7/2008 | Zhang | |
| 7,457,825 B2 | 11/2008 | Li | |
| 7,639,890 B2 | 12/2009 | Kuriathungal | |
| 7,647,331 B2 | 1/2010 | Li | |
| 7,752,185 B1 | 7/2010 | Kilmartin | |
| 7,844,591 B1 * | 11/2010 | Lettau et al. | 707/706 |
| 8,194,986 B2 | 6/2012 | Conwell | |
| 2003/0026476 A1 * | 2/2003 | Shiiyama | 382/165 |
| 2003/0108237 A1 | 6/2003 | Hirata | |

(Continued)

FOREIGN PATENT DOCUMENTS

| | | |
|---|---|---|
| EP | 0990997 A1 | 4/2000 |
| JP | H06-168277 A | 6/1994 |

(Continued)

OTHER PUBLICATIONS

Jing, et al., "PageRank for Product Image Search," Apr. 21-25, 2008, pp. 307-315, http://www2008.org/papers/pdf/p307-jingA.pdf.

(Continued)

*Primary Examiner* — Carol Choi
(74) *Attorney, Agent, or Firm* — Shook, Hardy & Bacon L.L.P.

(57) ABSTRACT

Image descriptor identifiers are used for content-based search. A plurality of descriptors is determined for an image. The descriptors represent the content of the image at respective interest points identified in the image. The descriptors are mapped to respective descriptor identifiers. The image can thus be represented as a set of descriptor identifiers. A search is performed on an index using the descriptor identifiers as search elements. A method for efficiently searching the inverted index is also provided. Candidate images that include at least a predetermined number of descriptor identifiers that match those of the image are identified. The candidate images are ranked and at least a portion thereof are presented as content-based search results.

20 Claims, 15 Drawing Sheets

(56) References Cited

U.S. PATENT DOCUMENTS

| | | |
|---|---|---|
| 2005/0238198 A1 | 10/2005 | Brown |
| 2006/0056832 A1 | 3/2006 | Yamaguchi et al. |
| 2006/0226119 A1 | 10/2006 | Kannan et al. |
| 2006/0251292 A1* | 11/2006 | Gokturk ............ G06F 17/30253 382/103 |
| 2007/0067345 A1* | 3/2007 | Li et al. ...................... 707/104.1 |
| 2007/0077987 A1* | 4/2007 | Gururajan et al. ............. 463/22 |
| 2007/0078846 A1 | 4/2007 | Gulli |
| 2007/0236712 A1 | 10/2007 | Li |
| 2007/0237426 A1 | 10/2007 | Xie et al. |
| 2008/0027983 A1* | 1/2008 | Erol et al. .................. 707/104.1 |
| 2008/0144943 A1 | 6/2008 | Gokturk |
| 2008/0154798 A1* | 6/2008 | Valz .............................. 705/400 |
| 2009/0041366 A1 | 2/2009 | Li et al. |
| 2009/0300055 A1 | 12/2009 | Mestha |
| 2010/0088295 A1 | 4/2010 | Duan |
| 2010/0226582 A1 | 9/2010 | Luo et al. |
| 2011/0103699 A1 | 5/2011 | Ke et al. |

FOREIGN PATENT DOCUMENTS

| | | |
|---|---|---|
| JP | H10-289240 A | 10/1998 |
| JP | 2002-140332 A | 5/2002 |
| JP | 2002-519749 A | 7/2002 |
| JP | 2006-338313 A | 12/2006 |
| JP | 2009-169689 A | 7/2009 |
| WO | 99/67696 A2 | 12/1999 |
| WO | 2008073505 A1 | 6/2008 |
| WO | 2009/130451 A1 | 10/2009 |

OTHER PUBLICATIONS

Chang, et al., "Columbia University TRECVID-2005, Video Search and High-Level Feature Extraction," Oct. 28, 2005, 9 pages, http://citeseerx.ist.psu.edu/viewdoc/download?doi=10.1.1.111.5794&rep=rep1&type=pdf.

Xu, et al., ""Near Duplicate Identification with Spatially Aligned Pyramid Matching,"" retrieved Jun. 8, 2010, 11 pages, http://vc.sce.ntu.edu.sg/index_files/TCSVT-SAPM_Double.pdf".

Henry A. Rowley, Google, Inc., Mountain View, CA, USA, Yushi Jing, College of Computing, Georgia Institute of Technology, Atlanta, GA, USA, and Shumeet Baluja, Google, Inc., Mountain View, CA, USA, Large Scale Image-Based Adult-Content Filtering; Feb. 28, 2006; 7 pages; http://www.cs.cmu.edu/afs/cs/usr/har/Web/visapp2006.pdf.

Shau Hong, School of Information & Engineering, Shenyang University of Technology, Shenyang, China, Cui Wen-Cheng, Network Management Center, Shenyang University of Technology, Shenyang, China, Tang Li, Software Center, Northeastern University, Shenyang, China, Medical Image Description in Content-Based Image Retrieval; Jan. 18, 2006;4 pages, http://ieeexplore.ieee.org/stamp/stamp.jsp?tp=&arnumber=1615946.

W.W. Chu, Department of Computer Science, University of California, Los Angeles, CA, USA, C.-C. Hsu, I.T. Leong, NCR Corporation, 100 N. Sepulveda Blvd., El Segundo, CA, USA, and R.K. Taira, Department of Radiological Sciences, University of California, Los Angeles, CA, USA, Content-Based Image Retrieval Using Metadata and Relaxation Techniques. 1998. 41 pages, http://www.kmed.cs.ucla.edu/papers/chap6.ps.

Mingjing Li and Wei-Yung Ma, Image Search Engine—Abstract, Introduction, Web image search engine, Collection-based search engine, Content-based image retrieval, Conclusion—Retrieved Date: Oct. 22, 2009, 5 pages, http://encyclopedia.jrank.org/articles/pages/6764/Image-Search-Engine.html.

Qi Zhang, Sally A. Goldman, Wei Yu, and Jason E. Fritts, "Content-Based Image Retrieval Using Multiple-Instance Learning," Retrieved Date: Oct. 22, 2009, 8 pages, http://citeseerx.ist.psu.edu/viewdoc/download? doi=10.1.1.18.2380&rep=rep1&Type=pdf.

Shih-Fu Chang and John R. Smith, "Extracting Multi-Dimensional Signal Features for Content-Based Visual Query," SPIE Symposium on Visual Communications and Signal Processing, Published Date: May 1995, 12 pages, http://www.ee.columbia.edu/in/dvmm/publications/95/chang95b.pdf.

http://www.alphaworks.ibm.com/tech/imars, May 21, 2009 http://www.alphaworks.ibm.com/tech/imars/faq#01, May 21, 2009.

Nonfinal Office Action mailed, Feb. 21, 2012, in U.S. Appl. No. 12/913,430, 32 pp.

Nonfinal Office Action mailed, Jun. 28, 2012, in U.S. Appl. No. 12/822,873, 11 pp.

Final Office Action mailed Nov. 1, 2012, in U.S. Appl. No. 12/913,430, 19 pages.

Final Office Action mailed Nov. 7, 2012, in U.S. Appl. No. 12/822,873, 18 pages.

Notice of Allowance in U.S. Appl. No. 12/822,873, mailed Jan. 16, 2013.

European Search Report dated Sep. 5, 2016 in European Patent Application No. 10827668.4, 12 pages.

Shiliang Zhang et al: "Descriptive visual words and visual phrases for image applications", Proceedings of the Seventeen ACM International Conference on Multimedia, MM '09, Oct. 19, 2009 (Oct. 19, 2009),—Oct. 24, 2009 (Oct. 24, 2009), pp. 75-84, XP055007017, New York, USA DOI: 10.1145/1631272.1631285 ISBN: 978-1-60-558608-3.

Clarke C L A et al: "An Algebra for Structured Text Search and a Framework for Its Implementation", Computer Journal, Oxford University Press, Surrey, GB, vol. 38, No. 1, 1995, pp. 43-56, XP000518611, ISSN: 0010-4620.

Final Office Action dated Sep. 24, 2014 in U.S. Appl. No. 12/913,430, 18 pages.

\* cited by examiner

CONTENT-BASED IMAGE SEARCH

BACKGROUND

Various methods for search and retrieval of information, such as by a search engine over the Internet, are known in the art. Such methods typically employ text-based searching. Text-based searching employs a search query that comprises one or more textual elements such as words or phrases. The textual elements are compared to an index or other data structure to identify webpages, documents, images, and the like that include matching or semantically similar textual content, metadata, file names, or other textual representations.

The known methods of text-based searching work relatively well for text-based documents, however they are difficult to apply to image files and data. In order to search image files via a text-based query the image file must be associated with one or more textual elements such as a title, file name, or other metadata or tags. The search engines and algorithms employed for text based searching cannot search image files based on the content of the image and thus, are limited to identifying search result images based only on the data associated with the images. Further, such search engines are not able to perform a search based on a search query that comprises an image.

Methods for content-based searching of images have been developed that utilize one or more analysis of the content of the images to identify visually similar images. These methods however are laborious and may require a great deal of input from a user to characterize an image before a search can be performed. Further, such methods are inefficient and do not scale well to a large scale, wherein, for example, several billion images must be quickly searched to identify and provide search result images to a user.

SUMMARY

Embodiments of the invention are defined by the claims below, not this summary. A high-level overview of various aspects of the invention are provided here for that reason, to provide an overview of the disclosure, and to introduce a selection of concepts that are further described below in the detailed-description section below. This summary is not intended to identify key features or essential features of the claimed subject matter, nor is it intended to be used as an aid in isolation to determine the scope of the claimed subject matter.

Embodiments of the invention are generally directed to content-based image searching are provided. The content of images is analyzed and employed to identify search results. A search query is received that may include an image. The image is processed to identify points of interest therein. Descriptors are determined for one or more of the points of interest and are each mapped to a descriptor identifier. The search is performed via a search index using the descriptor identifiers as search elements. The search index employs an inverted index based on a flat index location space in which descriptor identifiers of a number of indexed images are stored and are separated by an end-of-document indicator between the descriptor identifiers for each indexed image. Candidate images that include at least a predetermined number of matching descriptor identifiers are identified from the indexed images. The candidate images are ranked and provided in response to the search query. One or more text words or text-based searches may also be included to identify candidate images based on image content and/or to provide one or more text-based search queries.

DESCRIPTION OF THE DRAWINGS

Illustrative embodiments of the invention are described in detail below with reference to the attached drawing figures, and wherein.

DETAILED DESCRIPTION

Figure 1:
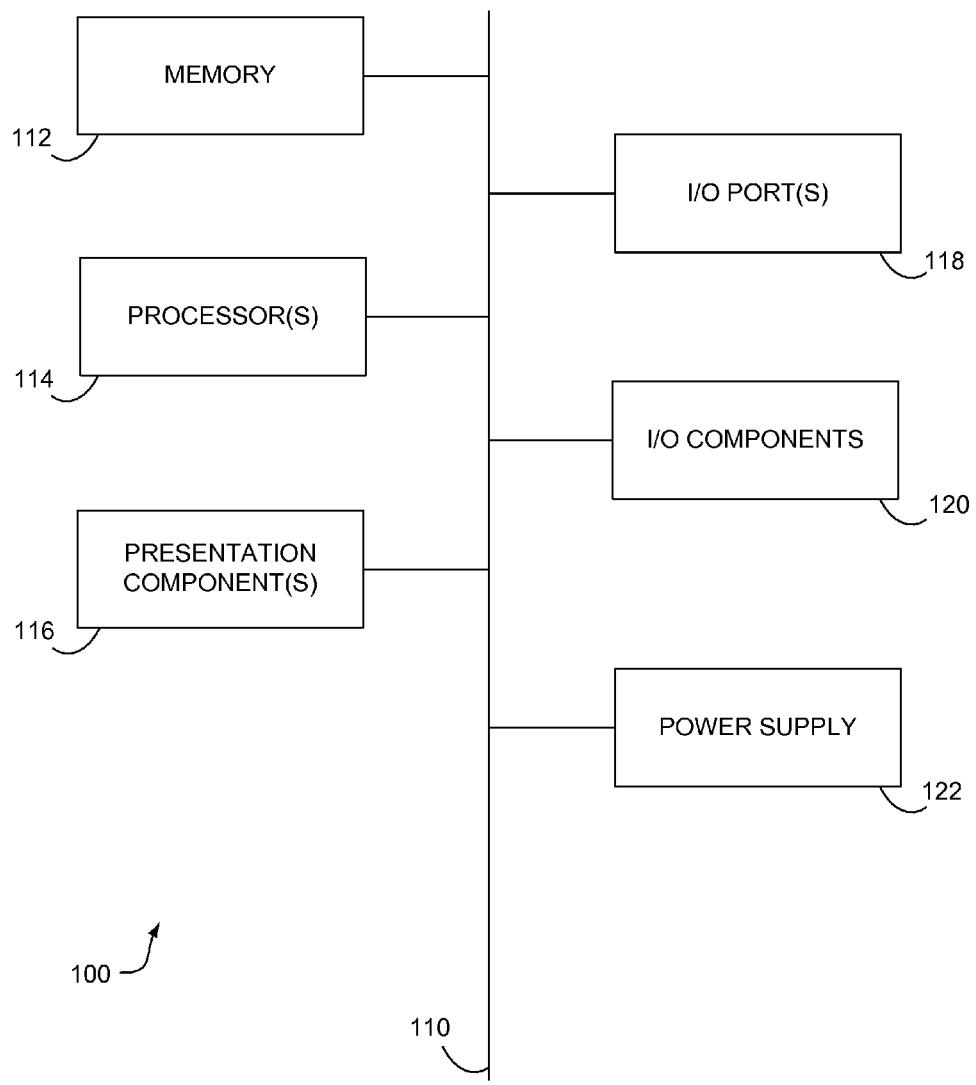
FIG. 1 is a block diagram depicting an exemplary computing device suitable for use in embodiments of the invention.

The subject matter of embodiments of the invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Embodiments of the invention include methods, systems, and computer-readable media for providing a content-based image search. Content-based image search analyzes and employs the actual content of an image to perform a search for visually similar images. The image content may include one or more of the colors, textures, shading, shapes, or other characteristics or information that can be derived from an image. Content-based image search may also be described as content-based image retrieval (CBIR), query by image content (QBIC), or content-based visual information retrieval (CBVIR) as is known in the art. In some embodiments, additional text-based information regarding an image and its content may be acquired from various sources, as described below, to inform the content-based search and to perform additional text-based searches in parallel to the content-based search.

In an embodiment, a computer-implemented method for searching images is provided. A search query is received. A computing device identifies a first descriptor identifier based on the search query. The first descriptor identifier corresponds to a descriptor that describes an interest point in an image. Indexed images are searched by comparing the first descriptor identifier to second descriptor identifiers associated with each of the indexed images. One or more of the indexed images are ranked based on the comparison.

In another embodiment, computer-readable media having computer-readable instructions embodied thereon that, when executed, perform a method for generating a representation of the content of an image for content-based image searching is provided. An image is received. Interest points are identified in the image. An interest point is a point, a region, or an area in the image that is identified by an operator algorithm. An image patch that includes an area of the image inclusive of the respective interest point is determined for each interest point. A descriptor is determined for each patch. Each descriptor is mapped to a descriptor identifier. The image is represented as a set of descriptor identifiers based on the mapping.

In another embodiment, a method of associating paid search results with algorithmic image-based search results is described. A search query is received. A descriptor identifier forming a first set of descriptor identifiers is identified by a computing device based on the search query. Each descriptor identifier corresponds to a descriptor that describes an image-based point of interest. Indexed images are searched by comparing the first set of descriptor identifiers with a second set of descriptor identifiers associated with the indexed images to generate search results. A paid search listing is associated with at least one of the descriptor identifiers in the first set to generate a paid search result.

Referring initially to FIG. 1 in particular, an exemplary computing device for implementing embodiments of the invention is shown and designated generally as computing device 100. The computing device 100 is but one example of a suitable computing device and is not intended to suggest any limitation as to the scope of use or functionality of invention embodiments. Neither should the computing device 100 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. Embodiments of the invention may be practiced in a variety of system configurations, including hand-held devices, consumer electronics, general-purpose computers, more specialty computing devices, etc. Embodiments of the invention may also be practiced in distributed computing environments where tasks are performed by remote-processing devices that are linked through a communications network.

With reference to FIG. 1, the computing device 100 includes a bus 110 that directly or indirectly couples the following devices: a memory 112, one or more processors 114, one or more presentation components 116, input/output ports 118, input/output components 120, and an illustrative power supply 122. The bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would be more accurately be grey and fuzzy. For example, one may consider a presentation component such as a display device to be an I/O component. Also, processors have memory. It is recognized that such is the nature of the art, and reiterate that the diagram of FIG. 1 is merely illustrative of an exemplary computing device that can be used in connection with one or more embodiments of the invention. Distinction is not made between such categories as "workstation," "server," "laptop," "hand-held device," etc., as all are contemplated within the scope of FIG. 1 and reference to "computing device."

The computing device 100 typically includes a variety of computer-readable media. By way of example, and not limitation, computer-readable media may comprises Random-Access Memory (RAM); Read-Only Memory (ROM); Electronically Erasable Programmable Read Only Memory (EEPROM); flash memory or other memory technologies; compact disc read-only memory (CD-ROM), digital versatile disks (DVD) or other optical or holographic media; magnetic cassettes, magnetic tape, magnetic disk storage or other magnetic storage devices, or any other medium that can be used to encode desired information and be accessed by the computing device 100.

The memory 112 includes computer-storage media in the form of volatile and/or nonvolatile memory. The memory 112 may be removable, nonremovable, or a combination thereof. Exemplary hardware devices include solid-state memory, hard drives, optical-disc drives, etc. The computing device 100 includes one or more processors that read data from various entities such as the memory 112 or the I/O components 120. The presentation component(s) 116 present data indications to a user or other device. Exemplary presentation components 116 include a display device, speaker, printing component, vibrating component, etc.

The I/O ports 118 allow the computing device 100 to be logically coupled to other devices including the I/O components 120, some of which may be built in. Illustrative components include a microphone, joystick, game pad, satellite dish, scanner, printer, wireless device, etc.

Figure 2:
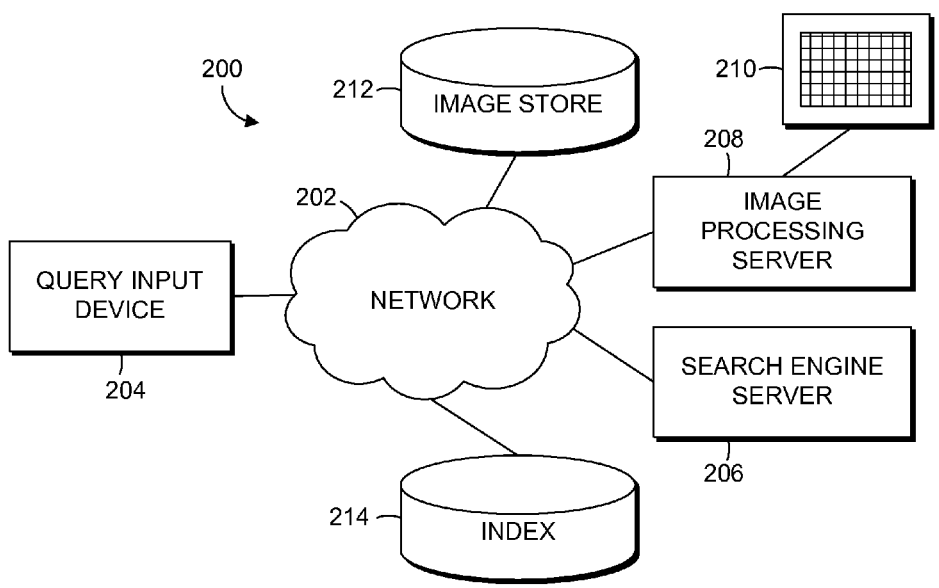
FIG. 2 is a block diagram depicting an exemplary network environment suitable for use in embodiments of the invention.

With additional reference to FIG. 2, a block diagram depicting an exemplary network environment 200 suitable for use in embodiments of the invention is described. The environment 200 is but one example of an environment that can be used in embodiments of the invention and may include any number of components in a wide variety of configurations. The description of the environment 200 provided herein is for illustrative purposes and is not intended to limit configurations of environments in which embodiments of the invention can be implemented.

The environment 200 includes a network 202, a query input device 204, and a search engine server 206. The network 202 includes any computer network such as, for example and not limitation, the Internet, an intranet, private and public local networks, and wireless data or telephone networks. The query input device 204 is any computing device, such as the computing device 100, from which a search query can be provided. For example, the query input device 204 might be a personal computer, a laptop, a server computer, a wireless phone or device, a personal digital assistant (PDA), or a digital camera, among others. In an embodiment, a plurality of query input devices 204, such as thousands or millions of query input devices 204, are connected to the network 202.

The search engine server 206 includes any computing device, such as the computing device 100, and provides at least a portion of the functionalities for providing a content-based search engine. In an embodiment a group of search engine servers 206 share or distribute the functionalities required to provide search engine operations to a user population.

An image processing server 208 is also provided in the environment 200. The image processing server 208 includes any computing device, such as computing device 100, and is configured to analyze, represent, and index the content of an image as described more fully below. The image processing server 208 includes a quantization table 210 that is stored in a memory of the image processing server 208 or is remotely accessible by the image processing server 208. The quantization table 210 is used by the image processing server 208 to inform a mapping of the content of images to allow searching and indexing as described below.

The search engine server 206 and the image processing server 208 are communicatively coupled to an image store 212 and an index 214. The image store 212 and the index 214 include any available computer storage device, or a plurality thereof, such as a hard disk drive, flash memory, optical memory devices, and the like. The image store 212 provides data storage for image files that may be provided in response to a content-based search of an embodiment of the invention. The index 214 provides a search index for content-based searching of the images stored in the image store 212. The index 214 may utilize any indexing data structure or format, and preferably employs an inverted index format.

An inverted index provides a mapping depicting the locations of content in a data structure. For example, when searching a document for a particular word, the word is found in the inverted index which identifies the location of the word in the document, rather than searching the document to find locations of the word.

In an embodiment, one or more of the search engine server 206, image processing server 208, image store 212, and index 214 are integrated in a single computing device or are directly communicatively coupled so as to allow direct communication between the devices without traversing the network 202.

Figure 3:
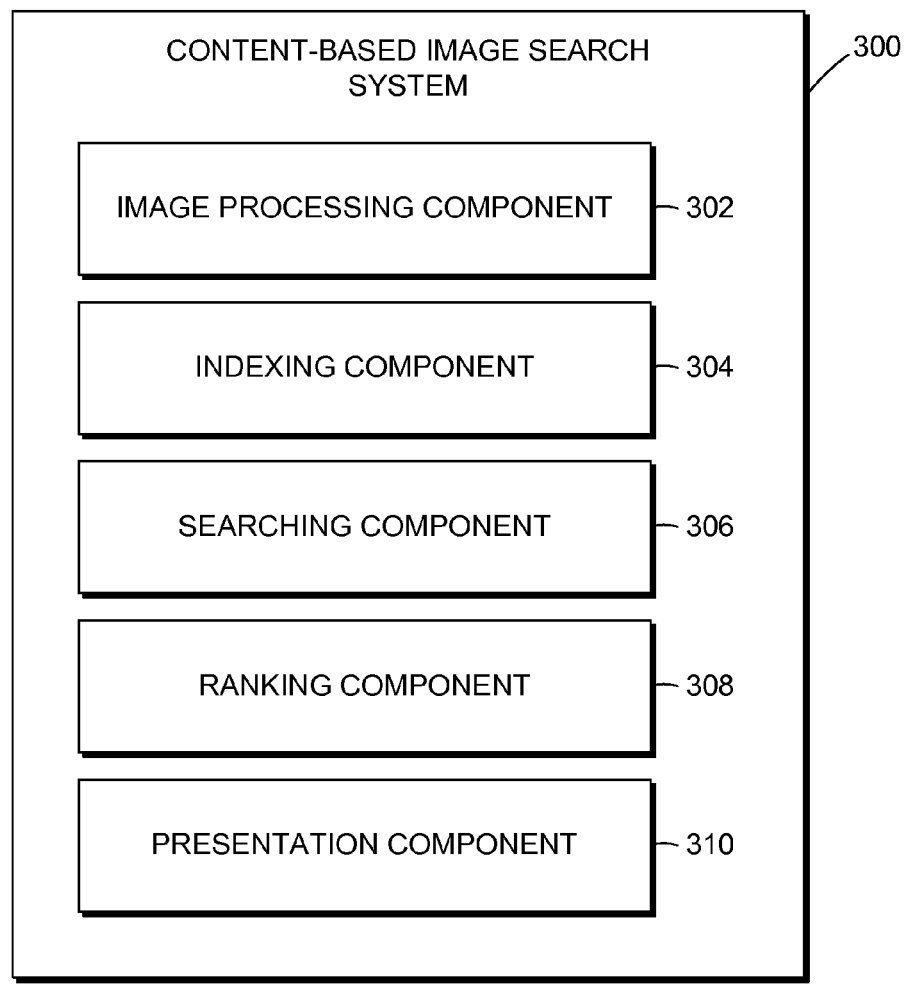
FIG. 3 is a block diagram depicting a system for content-based image search in accordance with an embodiment of the invention.

Referring now to FIG. 3 a system 300 for content-based image search in accordance with an embodiment of the invention is described. The system 300 may be embodied in and distributed over one or more computing devices and components, such as the search engine server 206, the image processing server 208, the quantizing table 210, image store 212 and the index 214 described above with respect to FIG. 2. The system 300 includes an image processing component 302, an indexing component 304, a searching component 306, a ranking component 308, and a presentation component 310. In another embodiment, the system 300 may include additional components, sub-components, or combinations of one or more of the components 302-310.

The image processing component 302 receives and processes images for content-based image searching. An image is received from a user via a computing device, such as the query input device 204, as a search query or as an upload of the image to a data store, such as image store 212. The image may also be received or collected from one or more other computing devices in communication with the network 202.

The image, or images, received by the image processing component 302 are in any electronic image format such as, for example and not limitation, raster formats including Joint Photographic Experts Group (JPEG), bitmap (BMP), tagged image file format (TIFF), and raw image format (RAW), vector formats including computer graphic metafile (CGM) and scalable vector graphics (SVG), and three-dimensional formats such as portable network graphics stereo (PNS), JPEG stereo (JPS), or multi-picture object (MPO), among other formats. The characteristics, such as image size, color scheme, resolution, quality, and file size of the image are not limited. The content of the images is also not limited and may include for instance, photographs, works of art, drawings, scanned media, and the like. Additionally, in an embodiment the image(s) might include video files, audio-video, or other multimedia files.

With additional reference now to FIGS. 12-16, the processing of an exemplary image 1200 by the system 300 is described in accordance with an embodiment of the invention. In an embodiment, to process the received image 1200, the image processing component 302 employs an operator algorithm. The operator algorithm identifies a plurality of interest points 1202 in the image 1200. The operator algorithm includes any available algorithm that is useable to identify interest points 1202 in the image 1200. In an embodiment, the operator algorithm is a difference of Gaussians algorithm or a Laplacian algorithm as are known in the art. In an embodiment, the operator algorithm is configured to analyze the image 1200 in two dimensions. Additionally, in another embodiment, when the image 1200 is a color image, the image 1200 is converted to grayscale.

Figure 12:
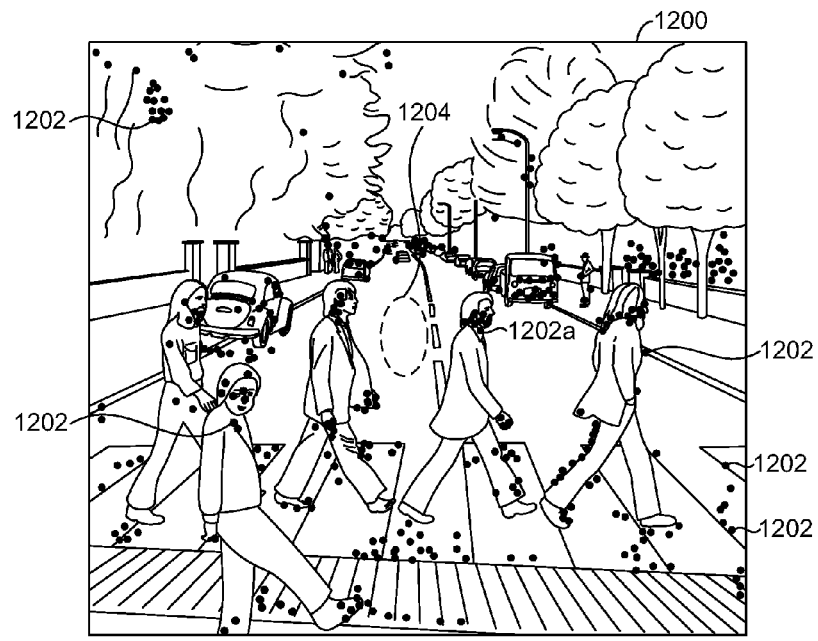
FIG. 12 is a line drawn representation of a graphical image depicting a plurality of interest points in the image in accordance with an embodiment of the invention.
Figure 13:
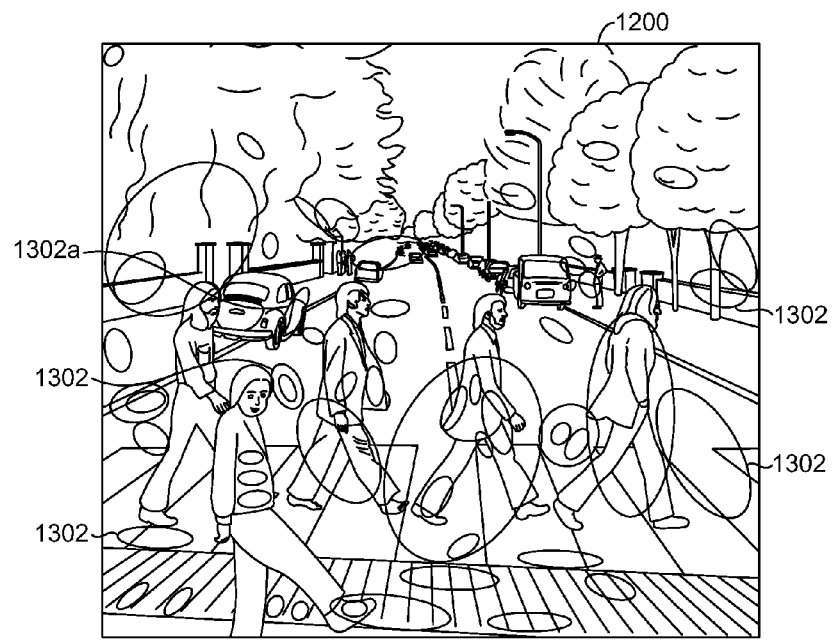
FIG. 13 is a line drawn representation of a graphical image depicting regions around interest points in the image in accordance with an embodiment of the invention.

An interest point 1202 includes any point in the image 1200 as depicted in FIG. 12, as well as a region 1302, area, group of pixels, or feature in the image 1200 as depicted in FIG. 13. The interest points 1202 and regions 1302 are referred to hereinafter as interest points 1202 for sake of clarity and brevity, however reference to the interest points 1202 is intended to be inclusive of both interest points 1202 and the regions 1302. In an embodiment, an interest point 1202 is located on an area in the image 1200 that is stable and includes a distinct or identifiable feature in the image 1200. For example, an interest point 1202 is located on an area of an image having sharp features with high contrast between the features such as depicted at 1202a and 1302a.

Conversely, an interest point is not located in an area with no distinct features or contrast, such as a region of constant color or grayscale as indicated by 1204.

The operator algorithm identifies any number of interest points 1202 in the image 1200, such as, for example, thousands of interest points. The interest points 1202 may be a combination of points 1202 and regions 1302 in the image 1200 and the number thereof may be based on the size of the image 1200. The image processing component 302 computes a metric for each of the interest points 1202 and ranks the interest points 1202 according to the metric. The metric might include a measure of the signal strength or the signal to noise ratio of the image 1200 at the interest point 1202. The image processing component 302 selects a subset of the interest points 1202 for further processing based on the ranking. In an embodiment, the one hundred most salient interest points 1202 having the highest signal to noise ratio are selected, however any desired number of interest points 1202 may be selected. In another embodiment, a subset is not selected and all of the interest points are included in further processing.

Figure 14:
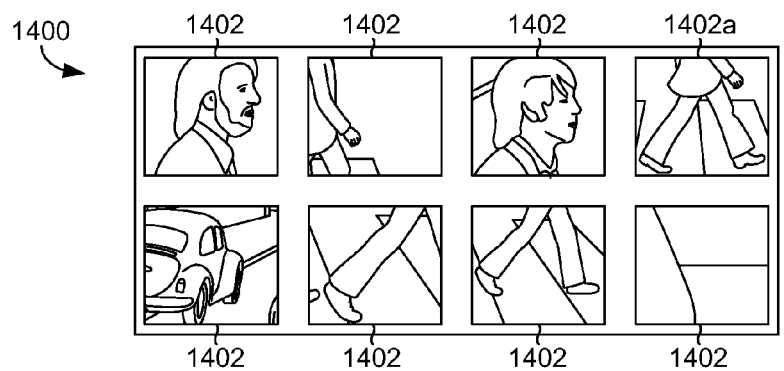
FIG. 14 is a line drawn representation of a set of patches determined from the image of FIG. 13 in accordance with an embodiment of the invention.
Figure 15:
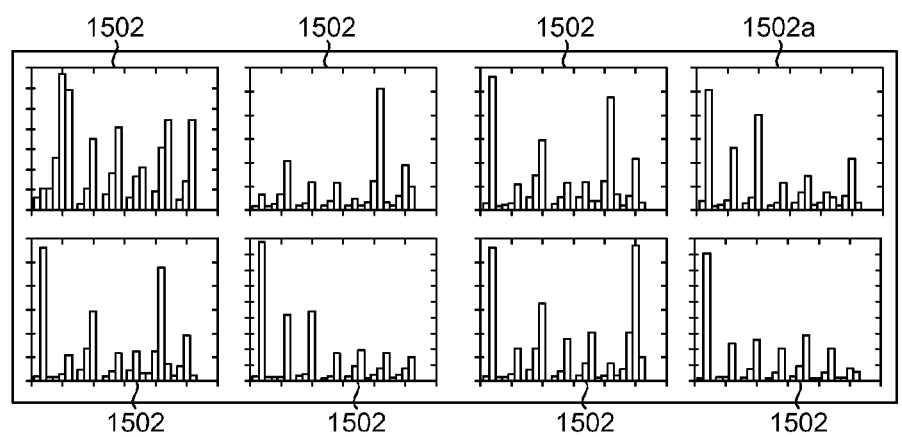
FIG. 15 is a representation of a set of descriptor histograms determined from the set of patches of FIG. 14 in accordance with an embodiment of the invention.

As depicted in FIG. 14, the image processing component 302 identifies a set of patches 1400 corresponding to the selected interest points 1202. Each patch 1402 corresponds to a single selected interest point 1202. The patches 1402 include an area of the image 1200 that includes the respective interest point 1202. The size of each patch 1402 to be taken from the image 1200 is determined based on an output from the operator algorithm for each of the selected interest points 1202. Each of the patches 1402 may be of a different size and the areas of the image 1200 to be included in the patches 1402 may overlap. Additionally, the shape of the patches 1402 is any desired shape including a square, rectangle, triangle, circle, oval, or the like. In the illustrated embodiment, the patches 1402 are square in shape.

The image processing component 302 normalizes the patches 1402 as depicted in FIG. 14. In an embodiment, the patches 1402 are normalized to conform each of the patches 1402 to an equal size, such as an X pixel by X pixel square patch. Normalizing the patches 1402 to an equal size may include increasing or decreasing the size and/or resolution of a patch 1402, among other operations. The patches 1402 may also be normalized via one or more other operations such as applying contrast enhancement, despeckling, sharpening, and applying a grayscale, among others.

The image processing component 302 also determines a descriptor for each normalized patch. A descriptor is determined by calculating statistics of the pixels in the patch 1402. In an embodiment, a descriptor is determined based on the statistics of the grayscale gradients of the pixels in a patch 1402. The descriptor might be visually represented as a histogram for each patch, such as a descriptor 1502 depicted in FIG. 15 (wherein the patches 1402 of FIG. 14 correspond with similarly located descriptors 1502 in FIG. 15). The descriptor might also be described as a multi-dimensional vector such as, for example and not limitation, a T2S2 36-dimensional vector that is representative of the pixel grayscale statistics.

Figure 16:
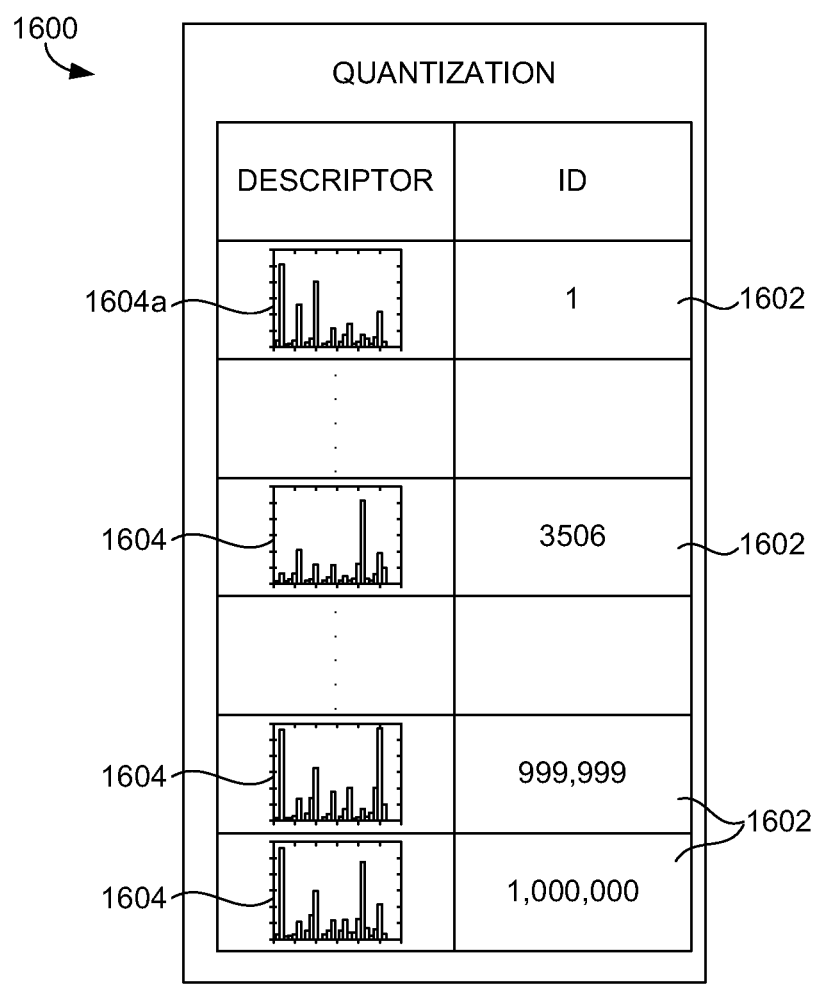
FIG. 16 is a representation of a quantization table suitable for use in embodiments of the invention.

As depicted in FIG. 16, a quantization table 1600 is employed by the image processing component 302 to identify a descriptor identifier 1602 for each descriptor 1502. The quantization table 1600 includes any table, index, chart, or other data structure useable to map the descriptors 1502 to the descriptor identifiers 1602. Various forms of quantization tables 1600 are known in the art and are useable in embodiments of the invention. In an embodiment, the quantization table 1600 is generated by first processing a large quantity of images (e.g. image 1200), for example a million images, to identify descriptors 1502 for each image. The descriptors 1502 identified therefrom are then statistically analyzed to identify clusters or groups of descriptors 1502 having similar, or statistically similar, values. For example, the values of variables in T2S2 vectors are similar. A representative descriptor 1604 of each cluster is selected and assigned a location in the quantization table 1600 as well as a corresponding descriptor identifier 1602. The descriptor identifiers 1602 include any desired indicator that is useable by the system 300 to identify a corresponding representative descriptor 1604. For example, the descriptor identifiers 1602 include integer values as depicted in FIG. 16, or alphanumeric values, numeric values, symbols, and text.

The image processing component 302 identifies, for each descriptor 1502, a most closely matching representative descriptor 1604 in the quantization table 1600. For example, a descriptor 1502a depicted in FIG. 15 most closely corresponds with a representative descriptor 1604a of the quantization table 1600 in FIG. 16. The descriptor identifiers 1602 for each of the descriptors 1502 are thereby associated with the image 1200 (e.g. the descriptor 1502a corresponds with the descriptor identifier 1602 "1"). The descriptor identifiers 1602 associated with the image 1200 may each be different from one another or one or more of the descriptor identifiers 1602 may be associated with the image 1200 multiple times (e.g. the image 1200 might have descriptor identifiers 1602 of "1, 2, 3, 4" or "1, 2, 2, 3"). In an embodiment, to take into account characteristics, such as image variations, a descriptor 1502 may be mapped to more than one descriptor identifier 1602 by identifying more than one representative descriptor 1604 that most nearly matches the descriptor 1502 and the respective descriptor identifier 1602 therefor. As such, the image processing component 302 provides a set of descriptor identifiers 1602 that represent the content of the image 1200 based on the set of identified interest points 1202.

With continued reference to FIG. 3, the indexing component 304 indexes the descriptor identifiers 1602 and stores the index to a memory, such as the index 214. In an embodiment, the indexing component 304 employs a flat index location space on which to base the indexing. A flat index location space (hereinafter "flat index") is a one dimensional listing or array in which the descriptor identifiers 1602 are sequentially listed. A location identifier is also provided for each descriptor identifier 1602 listed in the flat index that indicates the location of the respective descriptor identifier 1602 in the flat index. The descriptor identifiers 1602 for the image 1200 are listed sequentially and grouped together in the flat index.

An end-of-document identifier is provided by the index component 304 sequentially following the descriptor identifiers 1602 for the image 1200. The end-of-document identifier is also provided with a location identifier and is useable to indicate the end of a group of descriptor identifiers 1602 associated with a particular image 1200. As such, when the descriptor identifiers 1602 for a plurality of images 1200 are indexed in the flat index the descriptor identifiers 1602 for each image 1200 are grouped together and separated from the descriptor identifiers 1602 of another image 1200 by an end-of-document identifier located therebetween.

For example, an exemplary set of five images (e.g. image 1200) and their respective descriptor identifiers (e.g. descriptor identifiers 1602) are listed in Table 1. The descriptor identifiers in Table 1 are alpha characters, however the descriptor identifiers may use any number, symbol, or character as described above. Table 2 depicts a flat index representation of the five images indicating a location for each descriptor identifier in the flat index as well as end-of-document identifiers between the descriptor identifiers for each image.

TABLE 1

Exemplary Images

| Image | Descriptor Identifier |
|---|---|
| 1 | a, f, d |
| 2 | d, d |
| 3 | d, e |
| 4 | c, n, a, b, d |
| 5 | m, e |

TABLE 2

Flat Index Location Space

| Descriptor Identifier | a | f | d | * | d | d | * | d | e | * | c | n | a | b | d | * | m | e | * |
|---|---|---|---|---|---|---|---|---|---|---|---|---|---|---|---|---|---|---|---|
| Location Identifier | 1 | 2 | 3 | 4 | 5 | 6 | 7 | 8 | 9 | 10 | 11 | 12 | 13 | 14 | 15 | 16 | 17 | 18 | 19 |

In an embodiment, the indexing component 304 also determines an inverted index, such as the index 214, based on the flat index. The inverted index includes a data structure that provides a listing of all of the descriptor identifiers listed in the flat index and/or included in the quantization table 1600 described above. The locations at which each of the descriptor identifiers occurs in the flat index are indicated with respect to the descriptor identifiers. For example, Table 3 depicts an inverted index listing of the flat index of Table 2 in accordance with an embodiment of the invention. The end-of-document ("EDOC") locations are also indicated in the inverted index.

TABLE 3

Inverted Index

| Descriptor Identifier | Location |
|---|---|
| a | 1, 13 |
| b | 14 |
| c | 11 |
| d | 3, 5, 6, 8, 15 |
| e | 9, 18 |
| f | 2 |
| g | — |
| h | — |
| ... | ... |
| m | 17 |
| n | 12 |
| EDOC | 4, 7, 10, 16, 19 |

As such, the indexing component 304 can index a plurality of images based on their descriptor identifiers. In an embodiment, the indexing component 304 provides indexing for billions of images stored in one or more data stores, such as image store 212. As described previously with respect to FIG. 2, the index provided by the indexing component 304 is stored in a computer memory, such as the index 214. Additionally, the indexing component 304 may generate more than one index for the one or more data stores of images.

With continued reference to FIG. 3, the searching component 306 provides efficient content-based search. In an embodiment, the searching component 306 employs the inverted index to perform an efficient partial-matching content-based image search. The system 300 receives a search query from a user or other computing device. In an embodiment, the search query may be an image, such as the image 1200. The system 300, via the image processing component 302 described above, identifies descriptor identifiers 1602 that are representative of the image 1200. The searching component 306 performs an efficient partial-matching search for images stored in the image store(s) and indexed in the inverted index(es) based on the descriptor identifiers 1602 identified as representative of the image 1200. The search is described hereinafter with respect to a single index and image store for sake of clarity and simplicity, however such is not intended to limit applications of embodiments of the invention to a single index and image store.

To perform the partial-matching search, a minimum number ("M") of matching descriptor identifiers that an indexed image (e.g. an image stored in the image store and whose descriptor identifiers are indexed in the inverted index) must have to be considered a candidate image (e.g. possible search result) is identified. The minimum number M is predetermined based on factors such as the number of candidate images that are desired to be identified as candidate images, among other factors. In an embodiment, the minimum number M is predetermined by an administrator or a user.

The searching component 306 traverses the inverted index to identify location identifiers for each of the descriptor identifiers 1602 of the image 1200 that have the lowest values. The lowest values are compared to identify the M lowest of those values. The searching component 306 also determines an end-of-document location identifier ("EDOC-end") having the lowest value that is greater than the value of the highest location identifier value of the M lowest values. The EDOC-end location identifier identifies an indexed image whose descriptor identifiers directly precede the EDOC-end location identifier in the flat index location space. Further, the lower location bound ("start-of-document") of the indexed image (e.g. the first descriptor identifier location listed for the indexed image) can be determined by identifying the previous EDOC location identifier value and then moving one value up. As such, the searching component 306 identifies that the M lowest values must occur between the location identifier value for the start-of-document and the EDOC-end location identifier value, inclusive of the start-of-document location identifier value. When the searching component 306 determines that the M lowest values do lie within the identified location identifier values the respective indexed image is returned as a candidate image.

When the searching component 306 determines that the M lowest values do not lie within the start-of-document and EDOC-end location identifier values a second iteration of the process is completed to identify the next set of M lowest values. For example, the location identifier for the descriptor identifier 1602 having the lowest location identifier value may be incremented to the next indexed location identifier value and the M lowest values reassessed. The process is repeated until the inverted index is fully traversed.

Continuing with the exemplary images depicted in Tables 1-3 above, an exemplary iteration of the processes of the searching component 306 is described. Assuming for sake of example a search query is received comprising an image that is represented by query descriptor identifiers a, d, h, g, n. Additionally, it is assumed that two (2) descriptor identifiers must match with an indexed image to return the indexed image as a candidate image (e.g. M=2). Based on the inverted index provided in Table 3, the lowest values of the location identifiers for the query descriptor identifiers representing the search query image are:

TABLE 4a

Search, First Iteration

| Descriptor Identifier | Lowest Location Identifier Value |
|---|---|
| a | 1 |
| d | 3 |
| n | 12 |
| EDOC | 4 |

Thus, the searching component 306 determines that the two lowest location identifier values are 1 and 3 and that the lowest location identifier value for the EDOC that is larger than the largest location identifier value of the M lowest location identifier values is 4 (EDOC-end=4). Further, the start-of-document location identifier value is 1. Therefore, the values 1 and 3 are between the start-of-document and EDOC-end (inclusive of the start-of-document location identifier value) and the indexed image represented by the descriptor identifiers in locations 1-3, Image 1, is returned as a candidate image.

Continuing this example, once Image 1 is returned, the value of the EDOC-end location identifier is moved to its next location identifier value, 7 (e.g. current EDOC-end=7). The current start-of-document is set to one more than the previous value of EDOC-end (start-of-document=4+1=5). The location identifier values of the descriptor identifiers a and d are incremented to their next location identifier values not less than the start-of-document location identifier value respectively, because they were included in the indexed image that was returned as a candidate image. Additionally, although not depicted in this example, if there were any query descriptor identifiers having location identifier values less than the start-of-document location identifier value, the location identifier values of those query descriptor identifiers would also be incremented to their next value that is not less that the start-of-document location identifier value. The location identifier value of the descriptor identifier n is not incremented because its value was greater than the start-of-document location identifier value. Thus, the next set of lowest location identifier values depicted in Table 3 above is:

TABLE 4b

Search, Second Iteration

| Descriptor Identifier | Lowest Location Identifier Value |
|---|---|
| a | 13 |
| d | 5 |
| n | 12 |
| EDOC | 7 |

The searching component 306 identifies that there are no two location identifier values that are less than the EDOC location identifier value and thus, increments the EDOC location identifier value to the next lowest value listed in the inverted index that is greater that the lowest two location identifier values listed in the inverted index; in this example the EDOC location identifier value is incremented to 16 (EDOC-end=16). The start-of-document is identified to be 11 (e.g. one location larger than the next smaller EDOC value in the inverted index). The searching component 306 determines that two location identifier values, 13 and 12, lie between the start-of-document and EDOC-end location identifier values (inclusive of the start-of-document location identifier value) and thus, the indexed image represented by the descriptor identifiers listed in locations 11 through 15, Image 4, is returned as a candidate image. The searching component 306 continues this process until the entire inverted index is traversed.

The process of the searching component 306 efficiently searches the inverted index by employing the end-of-document location identifiers to allow skipping of images that do not include at least M matching descriptor identifiers. For instance, in the example described above with respect to Tables 1-4, the descriptor identifiers for Images 2 and 3 were skipped. Following the first iteration depicted in Table 4a, the next possible matching indexed image was identified as Image 4. As such, it was not necessary for the searching component 306 to consider the descriptor identifiers for Images 2 and 3. The advantages of the above partial-matching search are realized on a much greater scale in embodiments of the invention that are applied to large scale image storage and retrieval. For example, where the searching component 306 is tasked with searching several billion images and the minimum number of matching descriptor identifiers is ten (10) out of one hundred (100) descriptor identifiers stored for each indexed image, the ability to skip or quickly identify indexed images that do not include the minimum number of matching descriptor identifiers greatly increases the efficiency of the search.

In another embodiment, the minimum number, M, of matching descriptor identifiers is adjusted during the search process. A total or maximum number of search result images ("K") that are to be provided in response to a search query is identified. The minimum number, M, of matching descriptor identifiers may be set to any predetermined value including zero. The searching component 306 traverses the index to identify at least K indexed images having at least M matching descriptor identifiers with the search image, as described above.

The total number of matching descriptor identifiers for each of the K identified indexed images is tracked. The total number of matching descriptor identifiers for each of the K identified indexed images is compared to determine the lowest total number of matching descriptor identifiers ("L") for the K identified indexed images. In another embodiment, the lowest total number of matching descriptor identifiers, L, for the group of K identified indexed images is tracked rather than tracking and comparing the value for each individual indexed image of the K identified indexed images. The value of M is set equal to L which may be equal, to or greater than, the previous value of M.

Further, when an additional indexed image is identified by the searching component 306 that has at least M matching descriptor identifiers (where M is now equal to L), the additional indexed image is added to the group of the K identified indexed images and the indexed image in the group having the least number of matching descriptor identifiers is removed from the group. The value of L is recalculated for the group, and M is set equal to the new value. As such, the value of M is increased during the searching process based on the number of matching descriptor identifiers found in the top K identified indexed images. Thus, the efficiency of the searching process is increased as the searching process continues because more indexed images can be skipped based on the increasing value of M.

For example, assume M is initially set equal to ten (10) and that the searching component 306 identifies the first K indexed images in the index that have at least 10 matching descriptor identifiers. The searching component 306 also determines that all of the K identified indexed images actually have at least 32 matching descriptor identifiers. Thus, L is equal to 32 and M is then set equal to 32. As the searching component 306 continues the searching process the indexed images must now have at least 32 matching descriptor identifiers. The searching process continues and the value of M may be continually increased as the minimum total number of matching descriptor identifiers for the group, L, increases, as described above.

The searching component 306 may employ any available operations and data handling functionalities to aid in traversing the inverted index. In an embodiment, the searching component 306 employs a dynamic memory allocation, such as a heap, and operations associated therewith to aid in processing a search. Additionally, one or more searching components 306 can be employed to search multiple inverted indexes associated with chunks of memory storage for indexed images.

In another embodiment, the searching component 306 receives textual search elements, tags, and/or metadata with an image search query. The searching component 306 employs the textual search elements in any available manner to perform additional text-based searches and/or to inform the content-based search.

In another embodiment, one or more textual search elements, such as a textual word, are associated with one or more descriptor identifiers. As such, when the searching component 306 receives a search query that comprises an image and that is represented by the one or more descriptor identifiers associated with the textual search elements, the searching component 306 performs an additional text-based search based on the textual search elements. Alternatively, or in addition, when the textual search elements that are associated with one or more descriptor identifiers are received by the searching component 306, the searching component identifies the descriptor identifiers associated with the textual search elements and provides a content-based search for images containing the associated descriptor identifiers.

Additionally, in an embodiment, textual search elements including metadata, tags, and other information received with a search query or associated with descriptor identifiers are used to select and present paid listings, such as advertisements, banner ads, paid search results, and the like. The textual search elements may be used to identify paid listings directly or to identify categories, context, subject matter, or another characteristic of the search query that is useable to select one or more paid listings for presentation in response to the search query. Similarly, the descriptor identifiers received with the search query or identified therefrom may be used to identify paid listings directly or to identify categories, and the like that are useable to select a paid listing in response to the search query.

The indexed images that are returned as candidate images are next processed by the ranking component 308. Any available method or characteristic and combinations thereof can be used to rank the candidate images. Further, any desired operations including truncating ranked listing of candidate images may also be utilized. In an embodiment, the candidate images are ranked based on a total number of descriptor identifiers 1602 of the search image 1200 that match the descriptor identifiers of the candidate image. The ranked listing of candidate images is then truncated to remove candidate images that include the fewest number of matching descriptor identifiers and thus are least likely to be visually similar to the search image 1200.

In an embodiment, the ranking component 308 performs term frequency ranking and one or more geometric verifications and transformations on the candidate images and/or their respective descriptor identifiers. The transformations may include two- or three-dimensional transformations such as, for example and not limitation, a similarities transformation or an affine transformation. The transformations allow the ranking component 308 to further analyze the candidate images and descriptor identifiers therefore to re-rank, sort, or narrow the group of candidate images.

In an embodiment, in addition to the image content of the search image 1200 and the candidate images, the ranking component identifies one or more data elements associated with the search image 1200 or one or more of the candidate images to aid or inform the ranking of the candidate images. For example, a search image 1200 might be received along with one or more metadata data elements associated with the image 1200 or with one or more textual search elements. Such data elements and search elements further inform the ranking component 308 regarding the context of the search and the user's intent or interests in performing the search. Alternatively, or in addition, one or more of the candidate images have metadata or other data elements associated therewith that are useable by the ranking component 308 to aid in ranking the candidate images.

The ranked candidate images are configured and arranged by the presentation component 310. The presentation component 310 presents the candidate images as search result images via a user interface to a user and may incorporate any associated paid search results into the presentation thereof. In an embodiment, the search result images are presented to a user at a computing device, such as the query input device 204, via a search results webpage. The user can then select one or more of the search result images to view the images or be directed to a webpage on which the search result image is published, among a variety of other user interactions available in the art. Additionally, where additional text-based searching is performed based on textual search elements, metadata, or otherwise, the presentation component may also present text-based search results and paid listings to the user.

Figure 4:
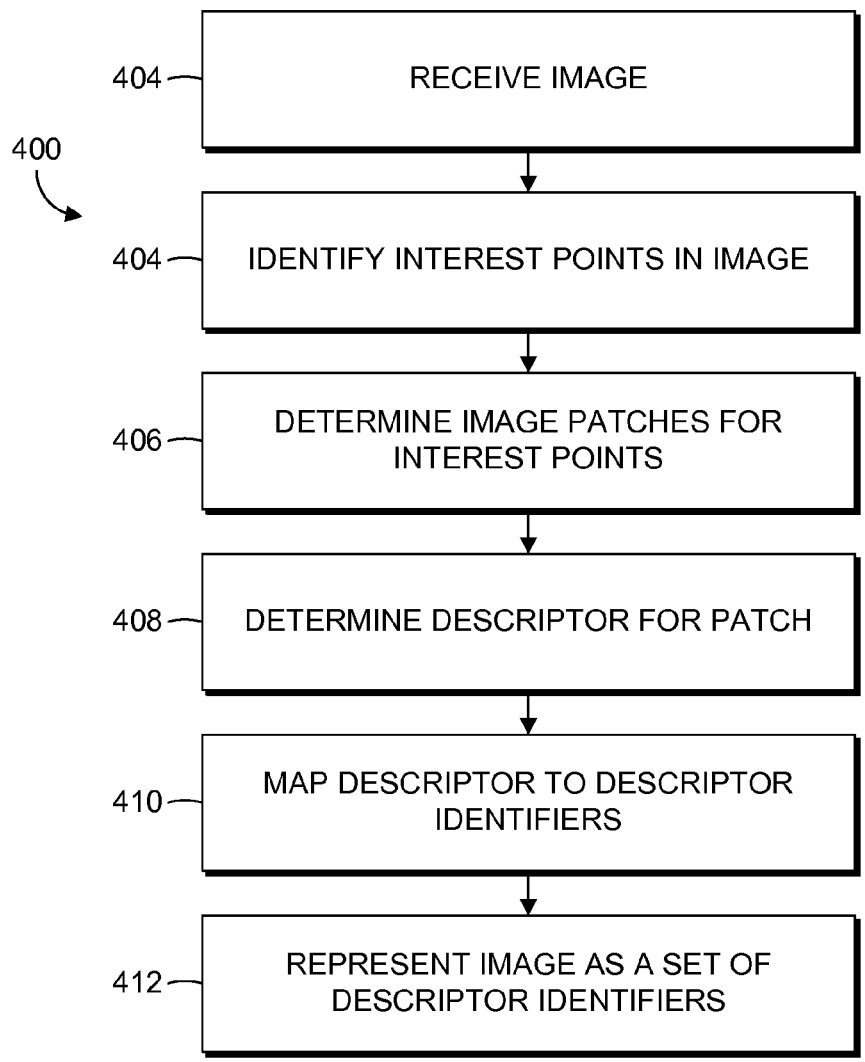
FIG. 4 is a flow diagram depicting a method for generating a representation of the content of an image for content-based image searching in accordance with an embodiment of the invention.

Referring now to FIG. 4 a flow diagram depicting a method 400 for generating a representation of the content of an image for content-based image searching in accordance with an embodiment of the invention is described. At 402 an image, such as the image 1200, is received. Interest points, such as the interest points 1202 are identified in the image through the use of an operator algorithm, as indicated at 404.

An image patch is determined for one or more of the interest points as described previously above and as indicated at 406. The image patch includes an area of the image that is inclusive of the respective interest point and may overlap other patches determined from the image. A descriptor is determined for each patch, as indicated at 408. The descriptors are descriptive of the characteristics of the pixels of the image included in the patch. For example, the descriptors describe the grayscale or color gradients of the pixels in the patch or describe a statistical analysis of the pixels.

At 410, the descriptors are each mapped to a descriptor identifier corresponding to a most closely similar representative descriptor in a quantization table. The image is represented as a set of descriptor identifiers, as indicated at 412. As such, the content of the image is quantified in a manner that allows the content to be compared by a computing device to the similarly quantified content of other images in order to identify images that are visually similar.

Figure 5:
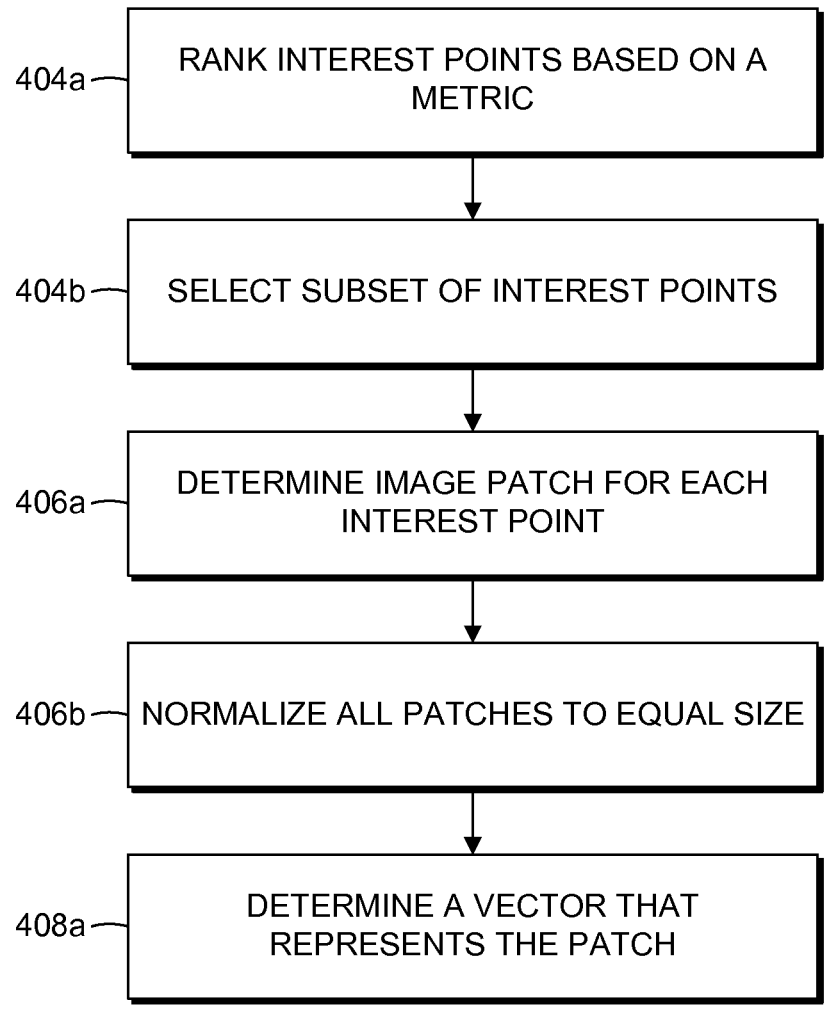
FIG. 5 is a flow diagram further depicting the method for generating a representation of the content of an image for content-based image searching depicted in FIG. 4 in accordance with an embodiment of the invention.

With reference now to FIG. 5, a flow diagram further depicting the method 400 for generating a representation of the content of an image for content-based image searching depicted in FIG. 4 is described in accordance with an embodiment of the invention. Following the identification of interest points in the image as described above, and indicated at 404, the interest points are ranked based on a metric, as indicated at 404a. The interest points may be ranked on any available metric such as, for example and not limitation, a signal strength or a signal to noise ratio of the image at or around the interest point. A subset of the interest points is selected based on the ranking, as indicated at 404b. The subset may include only a desired number of the most salient or highest ranked interest points, or may include all of the interest points. In another embodiment, the ranking and selection of a subset is not performed on the interest points, but rather is performed on the patches or descriptors that are determined in the subsequent steps described below.

At 406a an image patch is determined for each interest point in the subset as described previously. The image patches are normalized such that all of the image patches have the same size, as indicated at 406b. For example, the image patches may be increased or decreased in resolution such that all of the image patches have equal height and width pixel dimensions, such as 25 pixels×25 pixels. At 408a, a vector is determined that represents each patch. The vector is a multidimensional vector, such as a T2S2 vector having 36 dimensions, that represents the grayscale gradients of the pixels in the patch.

Figure 6:
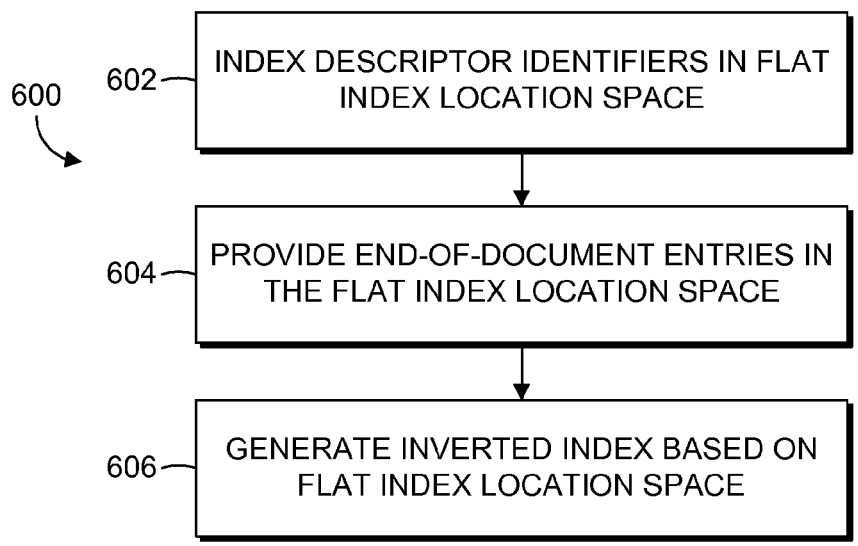
FIG. 6 is a flow diagram depicting a method for indexing descriptor identifiers in accordance with an embodiment of the invention.

Turning now to FIG. 6, a flow diagram depicting a method 600 for indexing descriptor identifiers in accordance with an embodiment of the invention is described. At 602, the descriptor identifiers for an image, such as the image 1200 are indexed in a flat index location space. The descriptor identifiers are grouped together and listed sequentially in the flat index location space and are followed by an end-of-document identifier, as indicated at 604. Each of the descriptor identifiers and the end-of document identifier are provided with a location identifier indicating their respective location in the flat index location space. In an embodiment, the descriptor identifiers are not actually provided with a location identifier, rather their locations are merely tracked or identifiable within the flat index location space. At 606, an inverted index is generated based on the descriptor identifiers and their respective location identifiers indexed in the flat index location space. The inverted index provides a listing of the descriptor identifiers along with indications of their respective locations within the flat index location space. The end-of-document identifiers are also included in the inverted index as described previously above.

Figure 7:
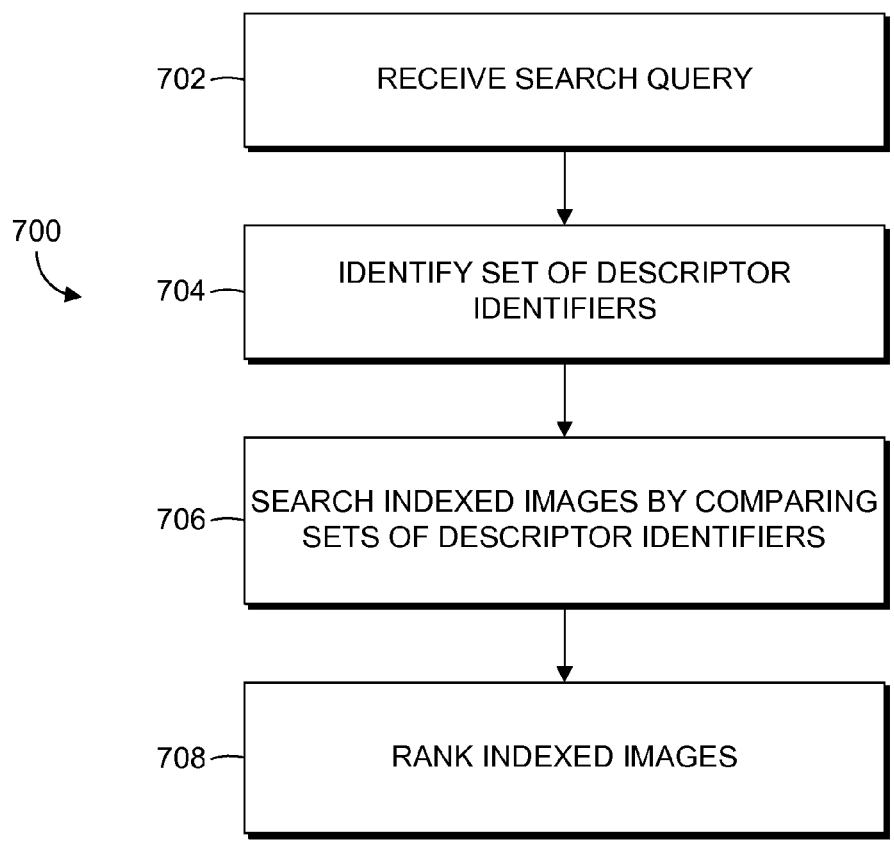
FIG. 7 is a flow diagram depicting a method for searching images in accordance with an embodiment of the invention.

With reference to FIG. 7, a flow diagram depicting a method 700 for providing content-based candidate images in accordance with an embodiment of the invention is described. At 702, a search query is received. In one embodiment, the search query includes an image as the search query. In an embodiment, the search query includes textual elements in addition to the image or instead of the image. In another embodiment, one or more data elements, such as metadata, that are descriptive of the image and/or the intent or context of the search query are received with the query. In a further embodiment, the search query is a text-based search query.

A set of descriptor identifiers is identified for the search query, as indicated at 704. As described previously, the descriptor identifiers are identified from the content of an image when the search query comprises an image. In an embodiment, the set includes one hundred (100) descriptor identifiers. In such an embodiment, using one hundred descriptor identifiers provides a compact representation of the content of the image while also provide sufficient content information to generate valuable results from the search. In an embodiment, the number of descriptor identifiers included in a set corresponds with the maximum number of search elements that are useable by a search engine to perform a search. In another embodiment, when a text-based search query is received, the descriptor identifiers are identified from a mapping of a textual element of the text-based search query to the descriptor identifiers. The mapping may be completed by providing a table, or other data structure, indicating one or more descriptor identifiers that are associated with a given textual element.

At 706, the set of descriptor identifiers is utilized to perform a search to identify candidate images where candidate images are indexed images that include at least a predetermined number of matching descriptor identifiers with the search query image. In an embodiment, performing the search compares the set of descriptor identifiers of the search query with a set of descriptor identifiers associated with each of the indexed images. In another embodiment, the set includes one hundred descriptor identifiers and the required number of matching descriptor identifiers is determined to be ten (10). Identifying indexed images with at least ten matching descriptor identifiers provides a sufficient, number of matching candidate images while also maintaining a desired level of precision.

The candidate images are ranked based on the total number of matching descriptor identifiers, as indicated at 708. In an embodiment, the candidate images are identified by multiple searches performed using multiple inverted indexes on an equal multiplicity of databases. The results of the multiple searches are then reported to a single computing device and are preliminarily ranked based on the total number of matching descriptor identifiers as described above. The results are then re-ranked using a term frequency-inverse document frequency (TF-IDF) ranking or based on one or more transformations, analysis, image characteristics, or the like.

Figure 8:
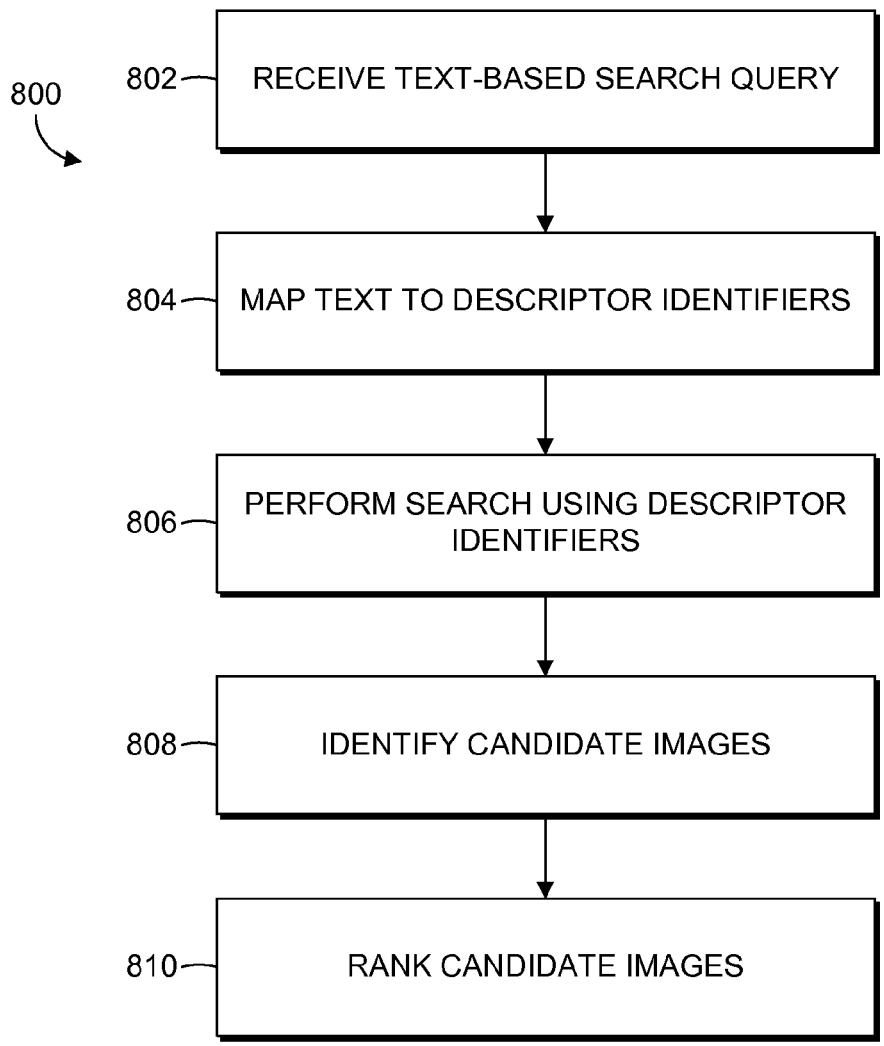
FIG. 8 is a flow diagram depicting a method for providing content-based candidate images and text-based search results in accordance with an embodiment of the invention.

With reference now to FIG. 8, a flow diagram depicting a method 800 for providing content-based candidate images in response to a text-based search query in accordance with an embodiment of the invention is described. At 802, a text-based search query including one or more textual search elements, such as a word or phrase, is received. At 804, one or more of the textual search elements is mapped to one or more descriptor identifiers associated with the textual search elements.

An association between one or more descriptor identifiers and textual search elements can be predefined and stored in a table or other data structure that is useable by a search engine to identify when such an association is present with a received text-based search query. For example, a set of descriptor identifiers might always, or nearly always occur in images of a soccer ball. Textual words relevant to soccer balls, such as for example "soccer," might be associated with that set of descriptor identifiers. Thus, when one of those words is received in a search query, the associated set of descriptor identifiers can be identified and a content-based search performed therewith, as indicated at 806. At 808, candidate images are identified via the search, thereby providing content-based search for images as a result of a text-based search query. At 810, the candidate images are ranked. The ranking may be based on any desired characteristic or algorithm, including ranking based on a total number of matching descriptor identifiers between the candidate image and the search query descriptor identifiers.

In another embodiment, a textual search result is provided in response to a search query where the search query is an image. Visually similar images to the query image are identified by a content-based search as described above. Textual elements, metadata, and other information associated with one or more of the visually similar images is aggregated. At least a portion of the aggregated data is then provided as a textual search result in response to the search query. For example, a user might capture an image of a product, such as a television, on their wireless phone and execute a search query based on the image. A user interface is then presented to the user displaying aggregated information based on the image, such as the name and model number of the product, prices of the television found at retailers, specifications, and the like. The aggregated information might be presented in an encyclopedic or similar informational format or may utilize a standard search results page format with links to various webpages, among other formats.

Figure 9:
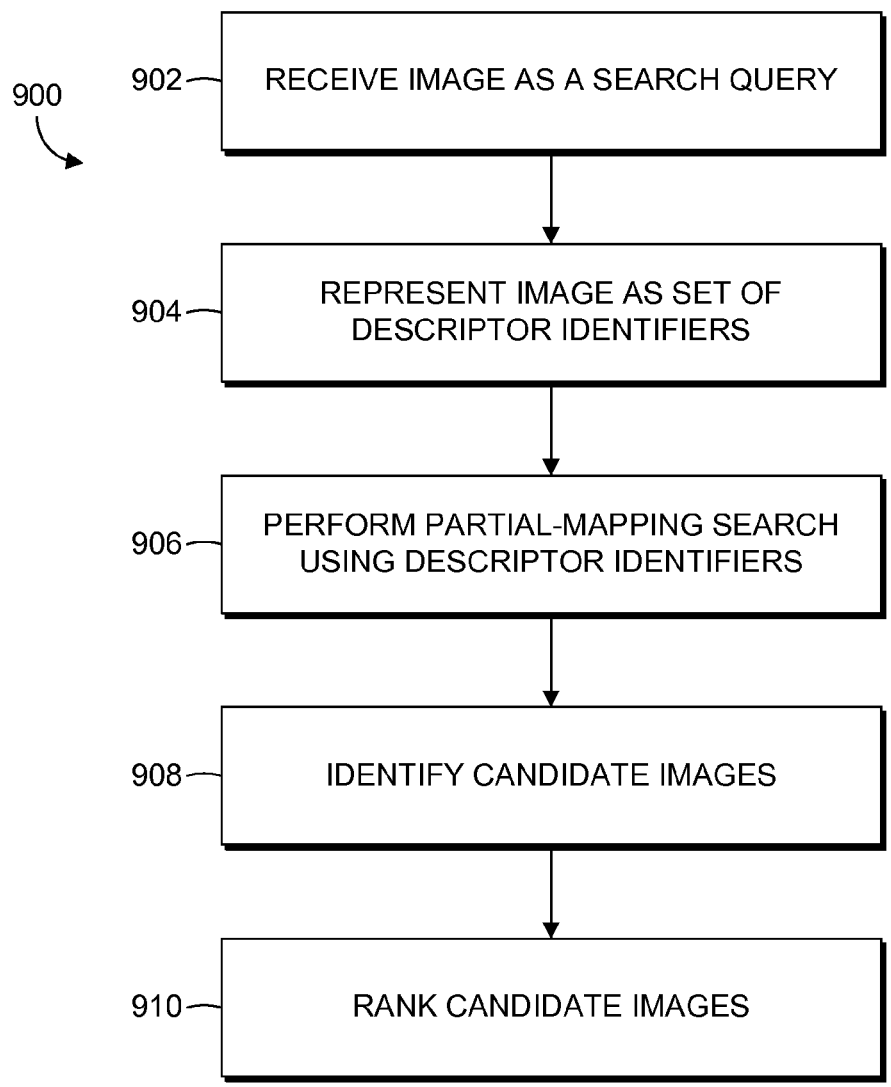
FIG. 9 is a flow diagram depicting a method for providing content-based candidate images in response to a text-based search query in accordance with an embodiment of the invention.

With reference to FIG. 9, a flow diagram depicting a method 1000 for providing candidate images for an image received as a search query in accordance with an embodiment of the invention is described. At 902, an image is received as a search query. At 904, the image is represented as a set of descriptor identifiers as described previously. A partial-matching content-based search is performed using each of the descriptor identifiers as a search element and using an inverted search index, as indicated at 906. At 908, candidate images are identified from the search based on the number of matching descriptor identifiers between the search query image and the candidate images. The identified candidate images are ranked based at least on a total number of matching descriptor identifiers with the search query image, as indicated at 910.

Figure 10:
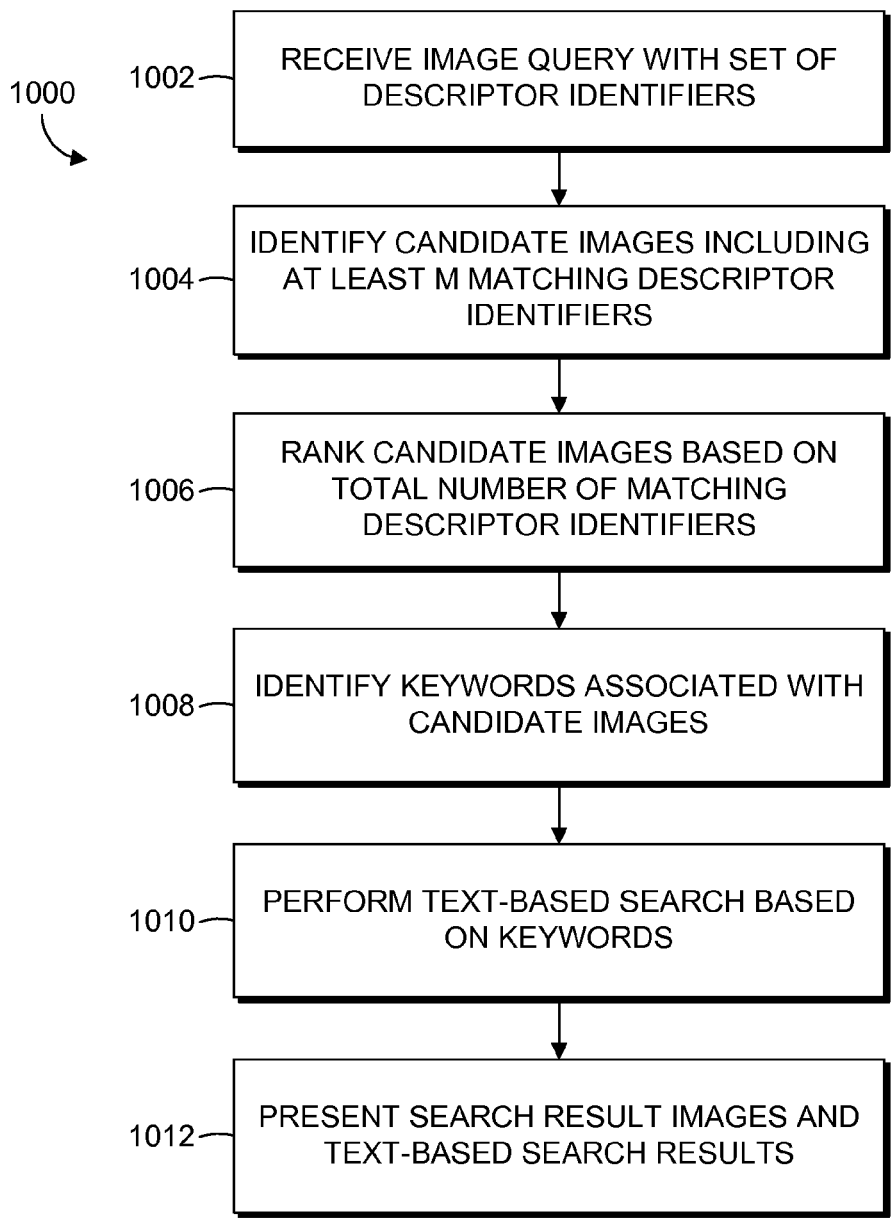
FIG. 10 is a flow diagram depicting a method for providing content-based candidate images for an image received as a search query in accordance with an embodiment of the invention.

With reference to FIG. 10, a flow diagram depicting a method 1000 for providing content-based candidate images and text-based search results in accordance with an embodiment of the invention is described. At 1002, an image query is received with a set of descriptor identifiers representing the content of an image. At 1004, candidate images that include at least a predetermined number of matching descriptor identifiers with the descriptor identifiers of the search query are identified. The candidate images are ranked based on a total number of matching descriptor identifiers, as indicated at 1006.

At 1008, keywords associated with the candidate images are identified. The keywords are identified from aggregated data elements for one or more of the candidate images. The data elements are collected and aggregated from webpages in which the candidate images are published, from file names of the candidate images, and from metadata associated with the candidate images. At 1010, a text-based search is performed based on one or more of the identified keywords. The candidate images are presented as search result images along with one or more text-based search results, as indicated at 1012. The search result images and text-based search results are presented in any manner known in the art, such as for example via a search results webpage. The text-based search results include any form of non-content-based search results known in the art, including, for example and not limitation, links to webpages, images, and the like.

Figure 11:
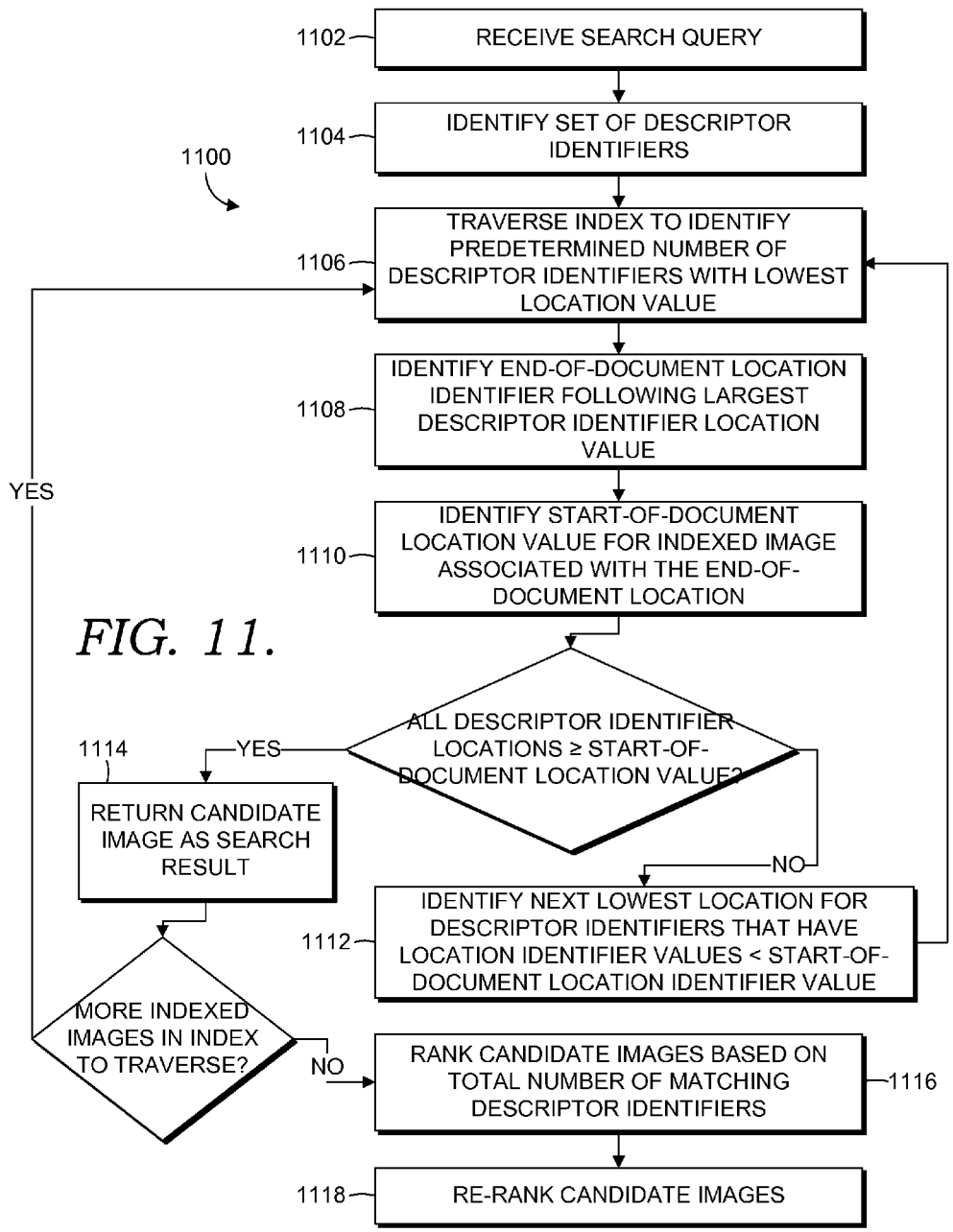
FIG. 11 is a flow diagram depicting a method for performing a content-based image query in accordance with an embodiment of the invention.

Referring now to FIG. 11, a flow diagram depicting a method 1100 for performing a content-based image query in accordance with an embodiment of the invention is described. At 1102, a search query is received. A set of descriptor identifiers is identified from the search query as indicated at 1104 and as described previously. At 1106, a portion of an index is traversed to identify a predetermined number of descriptor identifiers having the lowest location identifier values. In an embodiment, the index is an inverted index. At 1108, an end-of-document location identifier that follows the largest location identifier value of the predetermined number of descriptor identifiers having the lowest location identifier values is identified. At 1110, a start-of-document location value is identified for an indexed image that is associated with the end-of-document location identifier identified in step 1108. In an embodiment, the start-of-document location identifier value is equal to one location greater than the location identifier value of the end-of-document location identifier that immediately precedes the end-of-document location identifier identified in step 1108.

At 1112, when all of the location identifier values of the descriptor identifiers included in the predetermined number of descriptor identifiers having the lowest location identifier values are not greater than or equal to the start-of-document location identifier value, the location identifier value of one or more of the descriptor identifiers having a location identifier value less than the start-of-document location identifier value is incremented to the next lowest value for the respective descriptor identifier that is larger than the start-of-document location identifier value. The process then iterates back to 1106.

At 1114, when all of the identified location identifier values are greater than or equal to the start-of-document location identifier value, the associated image is returned as a candidate image. The process iterates back to 1106 when there are more indexed images in the index that may include the predetermined number of matching descriptor identifiers. At 1116, the candidate images are ranked base on the total number of matching descriptor identifiers between the candidate image and the search query. The number of candidate images may then be reduced based on the ranking and the remaining candidate images are re-ranked based on one or more geometric verifications, transformations, or other comparisons, as indicated at 1118. One or more of the re-ranked candidate images may then be presented as search result images to a user via a webpage or other user interface known in the art.

In another embodiment, a partial-matching content-based image search based on a query image, Q, employs a search algorithm following the below pseudocode.

```
While Current(EDOC) < MAX_LOC {
    Init: num_match = 0;
        EndDoc = Current(EDOC);
        StartDoc = Previous(EDOC) + 1;
        H.Clear( ); // clear the heap H, .
    For each descriptor identifier, w, in Q
        Seek(w, StartDoc);
        If loc(w) < EndDoc // current document contains
        descriptor identifier w
            num_match ← num_match + 1;
            NextDoc = EndDoc + 1;
        else
            NextDoc = loc(w);
        If H.Size < M
            H.Add(NextDoc);
        else if H.Top > NextDoc
            H.Pop( ); // remove the top element from heap.
            H.Add(NextDoc);
```

```
        If num_match >= M
                return current document;
        else
                Seek(EDOC, H.Top);
}
```

Embodiments of the invention can be utilized and adapted to increase the relevance and value of search result images and information returned in response to a search query performed as described above. Several exemplary embodiments of such are described below.

In one embodiment, a content-based search is performed for a query image on the index. The query image is a sample image from the index or is a new image received from a user. Metadata, tags, and other additional data associated with one or more of the search result images returned from the search are aggregated. From the aggregated data meaningful and relevant tags or metadata are constructed or identified and associated with the query image. As such, future content-based searches based on the query image and/or one of the search result images are more informed and can provide more relevant search results through use of the associated metadata and tags. Further, additional text-based searches can be performed for the query image to provide additional search results.

In another embodiment, a group of indexed images that belong to the same or similar domain, document, or subject matter are identified. The identified indexed images include one or more data elements that describe the content of the image or the domain to which the images belong. Content-based searches are performed for each of the images in the group on the index to identify visually similar search result images. The data elements describing the content or domain may then be propagated to the search result images. As such, images can be related to a subject matter, content type, or domain to further inform future searching of the index. For example, a group of images depicting adult content can be used to identify visually similar search result images in the index. The search result images can then be tagged as adult content. Further, the websites or domains from which those images are retrieved or published can be identified as adult content to inform subsequent content-based and text-based searching.

In another embodiment, duplicate, or nearly duplicate, images in the index are identified via content-based searching. Keywords associated with each of the duplicate images are identified and aggregated. The aggregated keywords are then associated with each of the duplicate images such that they are useable in future image- or text-based searches.

Figure 17:
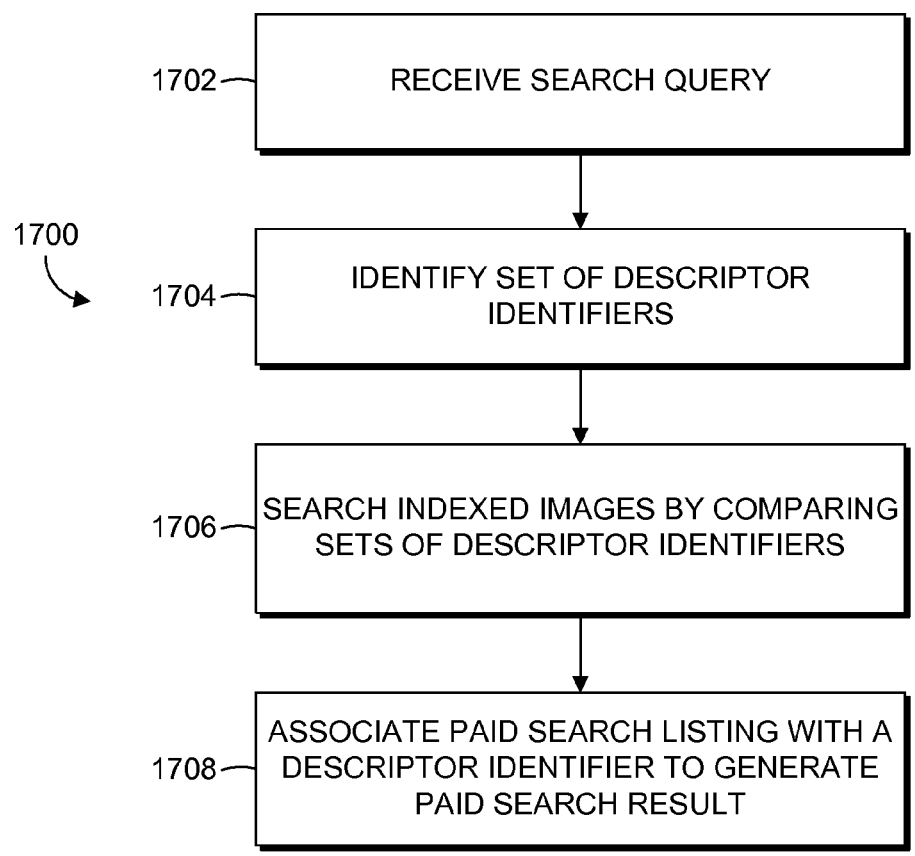
FIG. 17 is a flow diagram depicting a method for associating paid search results with algorithmic image-based search results in accordance with an embodiment of the invention.

In another embodiment of the invention, content-based search may be utilized in the presentation of paid listings or advertisements to a user. FIG. 17 depicts one such method 1700 for associating paid search results with algorithmic image-based search results in accordance with an embodiment of the invention. At 1702, a search query is received. The search query may include or comprise an image, an image with additional textual data, metadata, tags, and the like, or may be a text-based search query. A set of descriptor identifiers is identified based on the search query, as indicated at 1704. The indexed images are searched by comparing the set of descriptor identifiers with sets of descriptor identifiers associated with the indexed images as described previously above, as indicated at 1706.

At 1708, paid search listings are associated with one or more descriptor identifiers to generate at least one paid search result. For example, by aggregating metadata, tags, keywords, domains, and other information for an image or a group of images as described in the embodiments above, relevant paid search listings may be identified based on the aggregated data and presented to a user as paid search results along with the query search results. In another embodiment, one or more paid search listings are associated with a group of descriptor identifiers. As such, the one or more paid listings are presented to a user in response to receiving a search query associated with the group of descriptor identifiers. Alternatively, an advertisement might be associated with a keyword that is further associated with one or more descriptor identifiers. Thus, when a search query is received indicating the one or more descriptor identifiers, the keyword is determined based on the descriptor identifiers, and the advertisement is identified based on the keyword.

Additionally, content-based search might be used in the sale or auctioning of images and image content for paid listing or advertising purposes. Advertising rights can be sold, auctioned, or assigned for specific images or general image subject matter that is identifiable based on a set of descriptor identifiers for those images. Advertising rights might be sold for a specific image or for a set of descriptor identifiers that are associated with a specific image or group of images.

Many different arrangements of the various components depicted, as well as components not shown, are possible without departing from the scope of the claims below. Embodiments of the technology have been described with the intent to be illustrative rather than restrictive. Alternative embodiments will become apparent readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A computer-implemented method for searching a plurality of images, the method comprising:
  receiving a search query that includes an image;
  identifying, by a computing device, a plurality of first descriptor identifiers based on the search query, each of the first descriptor identifiers comprising an identifier used to identify a respective descriptor, each descriptor having been calculated over a respective portion of the image comprising a subset of pixels of the image that includes a respective interest point in the image;
  searching a plurality of indexed images in a search engine inverted index by comparing one or more of the first descriptor identifiers to one or more second descriptor identifiers associated with the indexed images to identify one or more candidate images, wherein the searching comprises;
  traversing the search engine inverted index to identify a predetermined number of second descriptor identifiers having location identifiers with lowest values;
  identifying an end-of-document location identifier that follows a largest location identifier value of the predetermined number of second descriptor identifiers having the location identifier with lowest values;
  identifying a start-of-document location value for a candidate indexed image that is identified by the end-of-document location identifier; and
  returning the candidate indexed image as a candidate image based on determining the location identifiers of all of the predetermined number of second descriptor identifiers having the lowest location identifier values are greater than or equal to the start-of-document location value; and ranking the one or more candidate images.

2. The computer-implemented method of claim 1, wherein the search query includes one or more textual words.

3. The computer-implemented method of claim 1, wherein the search engine inverted index is based on a flat index location space in which the second descriptor identifiers for each of the plurality of indexed images are listed sequentially with an end-of-document identifier following the second descriptor identifiers for each indexed image, and each second descriptor identifier and end-of-document identifier includes a location identifier that indicates their respective location in the flat index location space.

4. The computer-implemented method of claim 1, wherein the predetermined number of second descriptor identifiers is increased based on a minimum total number of matching second descriptor identifiers for a candidate image in a group of candidate images.

5. The computer-implemented method of claim 1, wherein the one or more candidate images are ranked based at least in part on one or more selected from the following: a term frequency ranking score, a geometric verification, or a two-dimensional image transformation including one or more of a similarities transformation and an affine transformation.

6. The computer-implemented method of claim 5, wherein the one or more candidate images are also ranked based on one or more selected from the following: image quality, metadata associated with one or more of the indexed images, and extracted data that is extracted and aggregated from a web page in which the indexed image is published.

7. The computer-implemented method of claim 1, further comprising:

associating at least one of the first descriptor identifiers with a textual word; and performing a text-based search query using the textual word.

8. One or more computer storage memory storing computer-useable instructions that, when used by one or more computing devices, cause the one or more computing devices to perform operations comprising:

receiving a search query;

identifying a plurality of first descriptor identifiers based on the search query;

searching a plurality of indexed images in a search engine inverted index by comparing one or more of the first descriptor identifiers to one or more second descriptor identifiers associated with the indexed images to identify one or more candidate images, each of the one or more second descriptor identifiers comprising an identifier used to identify a respective descriptor, each descriptor having been calculated over a respective portion of a respective indexed image comprising a subset of pixels of the respective indexed image that includes a respective interest point in the respective indexed image, wherein the searching comprises;

traversing the search engine inverted index to identify a predetermined number of second descriptor identifiers having location identifiers with lowest values;

identifying an end-of-document location identifier that follows a largest location identifier value of the predetermined number of second descriptor identifiers having the location identifier with lowest values;

identifying a start-of-document location value for a candidate indexed image that is identified by the end-of-document location identifier; and returning the candidate indexed image as a candidate image based on determining the location identifiers of all of the predetermined number of second descriptor identifiers having the lowest location identifier values are greater than or equal to the start-of-document location value; and ranking the one or more candidate images.

9. The one or more computer storage memory of claim 8, wherein the search query includes one or more textual words.

10. The one or more computer storage memory of claim 8, wherein the search query includes one or more images.

11. The one or more computer storage memory of claim 8, wherein the search engine inverted index is based on a flat index location space in which the second descriptor identifiers for each of the plurality of indexed images are listed sequentially with an end-of-document identifier following the second descriptor identifiers for each indexed image, and each second descriptor identifier and end-of-document identifier includes a location identifier that indicates their respective location in the flat index location space.

12. The one or more computer storage memory of claim 8, wherein the predetermined number of second descriptor identifiers is increased based on a minimum total number of matching second descriptor identifiers for a candidate image in a group of candidate images.

13. The one or more computer storage memory of claim 8, wherein the one or more candidate images are ranked based at least in part on one or more selected from the following: a term frequency ranking score, a geometric verification, or a two-dimensional image transformation including one or more of a similarities transformation and an affine transformation.

14. The one or more computer storage memory of claim 13, wherein the one or more candidate images are also ranked based on one or more selected from the following: image quality, metadata associated with one or more of the indexed images, and extracted data that is extracted and aggregated from a web page in which the indexed image is published.

15. The one or more computer storage memory of claim 8, the operations further comprising:

associating at least one of the first descriptor identifiers with a textual word; and performing a text-based search query using the textual word.

16. A computer device comprising:

one or more processors; and one or more computer storage devices storing computer-useable instructions that, when used by the one or more processors, cause the one or more processors to:

identify a plurality of first descriptor identifiers based on a search query;

search a plurality of indexed images in a search engine inverted index by comparing one or more of the first descriptor identifiers to one or more second descriptor identifiers associated with the indexed images to identify one or more candidate images, each of the one or more second descriptor identifiers comprising an identifier used to identify a respective descriptor, each descriptor having been calculated over a respective portion of a respective indexed image comprising a subset of pixels of the respective indexed image that includes a respective interest point in the respective indexed image, wherein the searching comprises;
traversing the search engine inverted index to identify a predetermined number of second descriptor identifiers having location identifiers with lowest values;
identifying an end-of-document location identifier that follows a largest location identifier value of the predetermined number of second descriptor identifiers having the location identifier with lowest values;
identifying a start-of-document location value for a candidate indexed image that is identified by the end-of-document location identifier; and
return the candidate indexed image as a candidate image based on determining the location identifiers of all of the predetermined number of second descriptor identifiers having the lowest location identifier values are greater than or equal to the start-of-document location value; and
rank the one or more candidate images.

17. The computer device of claim 16, wherein the search query includes one or more textual words and/or one or more images.

18. The computer device of claim 16, wherein the search engine inverted index is based on a flat index location space in which the second descriptor identifiers for each of the plurality of indexed images are listed sequentially with an end-of-document identifier following the second descriptor identifiers for each indexed image, and each second descriptor identifier and end-of-document identifier includes a location identifier that indicates their respective location in the flat index location space.

19. The computer device of claim 16, wherein the predetermined number of second descriptor identifiers is increased based on a minimum total number of matching second descriptor identifiers for a candidate image in a group of candidate images.

20. The computer device of claim 16, wherein the one or more candidate images are ranked based at least in part on one or more selected from the following: a term frequency ranking score, a geometric verification, a two-dimensional image transformation including one or more of a similarities transformation and an affine transformation, image quality, metadata associated with one or more of the indexed images, and extracted data that is extracted and aggregated from a web page in which the indexed image is published.

\* \* \* \* \*